SHROUD FOR SEWER CLEANING TRUCK

Original Filed Aug. 14, 1968 5 Sheets-Sheet 1

SHROUD FOR SEWER CLEANING TRUCK

Original Filed Aug. 14, 1968 5 Sheets-Sheet 1

SHROUD FOR SEWER CLEANING TRUCK

Original Filed Aug. 14, 1968 5 Sheets-Sheet 3

SHROUD FOR SEWER CLEANING TRUCK

Original Filed Aug. 14, 1968 5 Sheets-Sheet 4

SHROUD FOR SEWER CLEANING TRUCK

Original Filed Aug. 14, 1968 5 Sheets-Sheet 5

United States Patent Office

Re. 27,874
Reissued Jan. 8, 1974

27,874

SHROUD FOR SEWER CLEANING TRUCK

Benjamin P. Fisco, Jr., Cleveland Heights, Ohio, assignor to Aquatech Inc.

Original No. 3,570,526, dated Mar. 16, 1971, Ser. No. 752,662, Aug. 14, 1968. Application for reissue Aug. 23, 1971, Ser. No. 174,282
Int. Cl. F16k *49/00*
U.S. Cl. 137—340 14 Claims

Matter enclosed in heavy brackets [ ] appears in the original patent but forms no part of this reissue specification; matter printed in italics indicates the additions made by reissue.

ABSTRACT OF THE DISCLOSURE

In a mobile unit which includes a water reservoir; water-handling components including a hose reel and hose normally coiled thereon, pump means suitably connected between the reservoir and the hose to pump from the reservoir through the hose, valve means to control the flow of water; an internal combustion engine utilized to drive the pump means and a source of heat; the improvement for use with severe winter freezing conditions comprising a shroud assembly which in combination with a wall of the reservoir encloses the water-handling components and source of heat on all four sides and the top, the source of heat being arranged to circulate a flow of warm air within the space enclosed by the shroud in a continuous flow path against the wall of the reservoir and across and around the water-handling components to maintain all of such components and water in the reservoir above the freezing temperature of water.

The present invention relates to improvements in a mobile water handling and pumping unit, and in particular, to a novel means for keeping the water-handling components of such a unit in an unfrozen state during severe winter freezing conditions.

The invention is particularly applicable to mobile units for cleaning sewers by means of a water jet, and a novel means for keeping the water-handling components of such a unit in an unfrozen state, and the invention will be described with particular reference thereto, although it will be appreciated that the invention will be described with particular reference thereto, although it will be appreciated that the invention has broader application in connection with mobile water handling and pumping equipment which must be used, for whatever reason, under severe winter freezing conditions.

With reference to mobile sewer cleaning equipment, it is well known to provide mobile unit having; a reservoir for a large supply of water, water-handling components including a hose reel, a hose normally coiled thereon and a high-pressure pump suitably connected between the reservoir and the hose to deliver water to the hose at a high pressure. A nozzle at the free end of the hose reverses the direction of the high-pressure water in such a way as to develop a reaction force which pulls the hose into a sewer from the reel. It is conventional practice to provide a drive means for the pump including an internal combustion engine, the water-handling components and drive means usually being mounted upon a rear platform of a truck or on the bed of a trailer.

A major problem associated with such equipment has been that water-handling components freezeup in the winter if the water is left in any of the components during severe winter conditions, even when the equipment is in operation. If the pump or valve freeze, the problem becomes particularly serious in that the housings for these components are apt to crack. Manufacturers as a general rule advise against use of this kind of equipment in freezing weather, particularly severe freezing weather such as below +25° F.

It has been proposed to provide a suitable water bypass arrangement by which the water can be circulated through at least some of the water-handling components and back to the reservoir, but even this has failed to avoid freezing during severe winter conditions.

In accordance with the present invention the above problem is overcome in a simple and economical manner by providing in a mobile unit which includes a water reservoir and water-handing components including a hose reel and the means normally coiled thereon, a pump suitably connected between the hose means and reservoir to pump water from the reservoir through the hose means, and valve means to control the flow of water, the improvement for use in severe winter freezing conditions comprising a shround assembly which in combination with a wall of the water reservoir substantially completely encloses the top and all four sides of the space containing the water-handling components. A source of heat within the space, which may be associated with an internal combusion engine drive means for the pump, is arranged to circulate a continuous flow of warm air across and around all of the water-handling components against the wall of the reservoir to maintain all of such components and the water in the reservoir above the freezing temperature of water.

By suitable positioning and orienting the source of heat, the air is continuously recirculated within the space defined by the shroud and through the source of heat, bringing the temperature of the air up to and maintain it at a temperature necessary to keep the water-handling components and water in the reservoir above the freezing temperature.

In a preferred embodiment, the water-handling components and drive means are positioned on the rear part of the mobile unit behind the water reservoir and the internal combustion engine is liquor cooled with a radiator and fan assembly oriented to direct a stream of warm air against a wall of the reservoir and over the water-handling components, the warm air being confined by the shroud assembly.

In accordance with a limited aspect of the invention clutch means are provided between the internal combustion engine and the pump so that the engine can be disengaged from the pump and run to circulate heated air over the water-handling components during down periods to prevent freezing or to thaw out the equipment.

Preferably, means are provided for opening the shroud assembly during warm weather conditions. In particular, the shroud assembly is provided with a rear closure member which is adapted for quick opening and closing, and optionally, the sides of the mobile unit may be substantially completely opened.

The invention and advantages thereof will become apparent upon further consideration of the specifications, with reference to the accompanying drawings in which.

Figure 1:
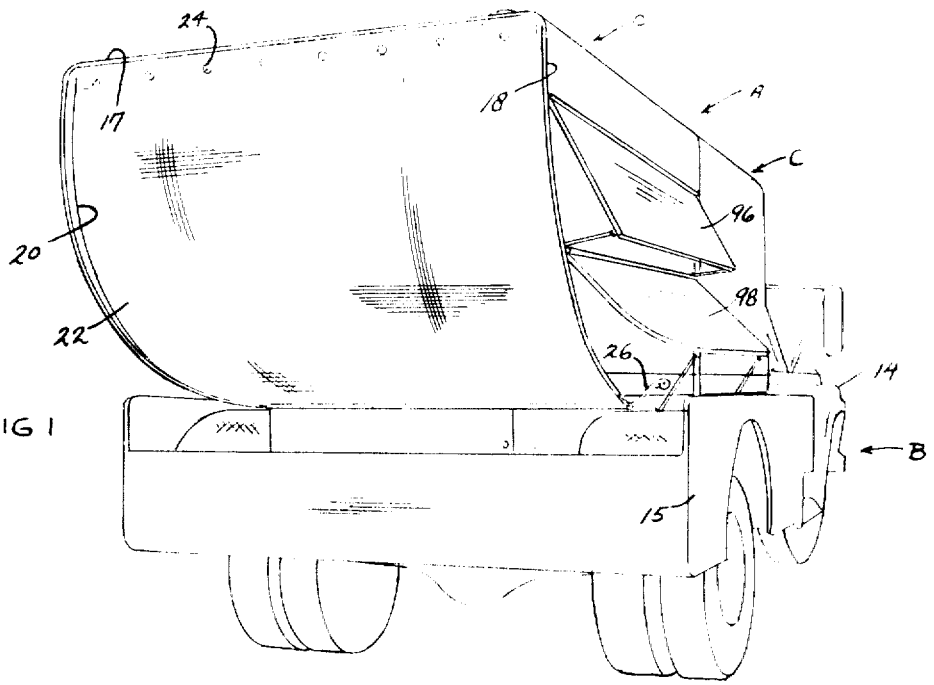
FIG. 1 is a perspective view of a sewer cleansing truck in accordance with the invention.
Figure 3:
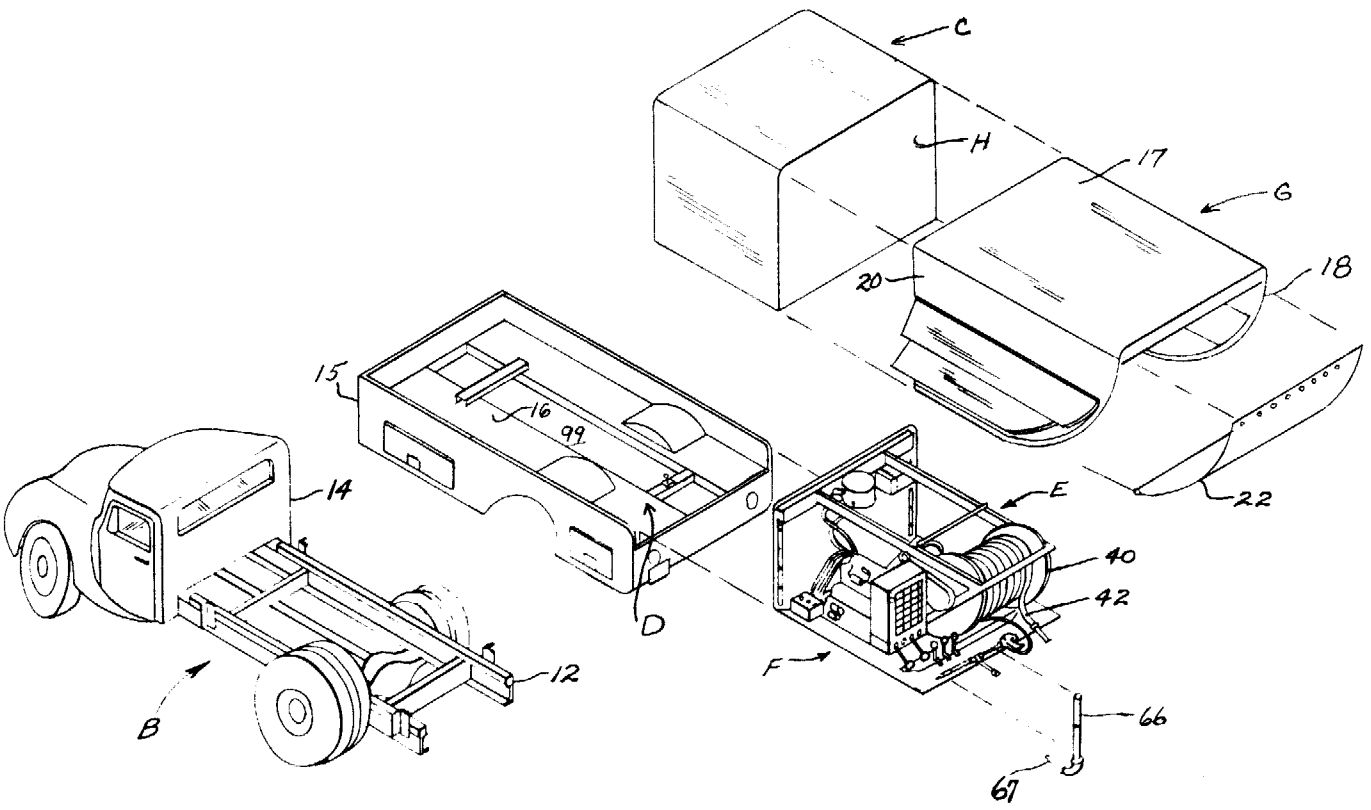
FIG. 3 is a perspective exploded view of a sewer cleaning truck which is shroud covered and enclosed in accordance with the concepts of the present invention.
Figure 6:
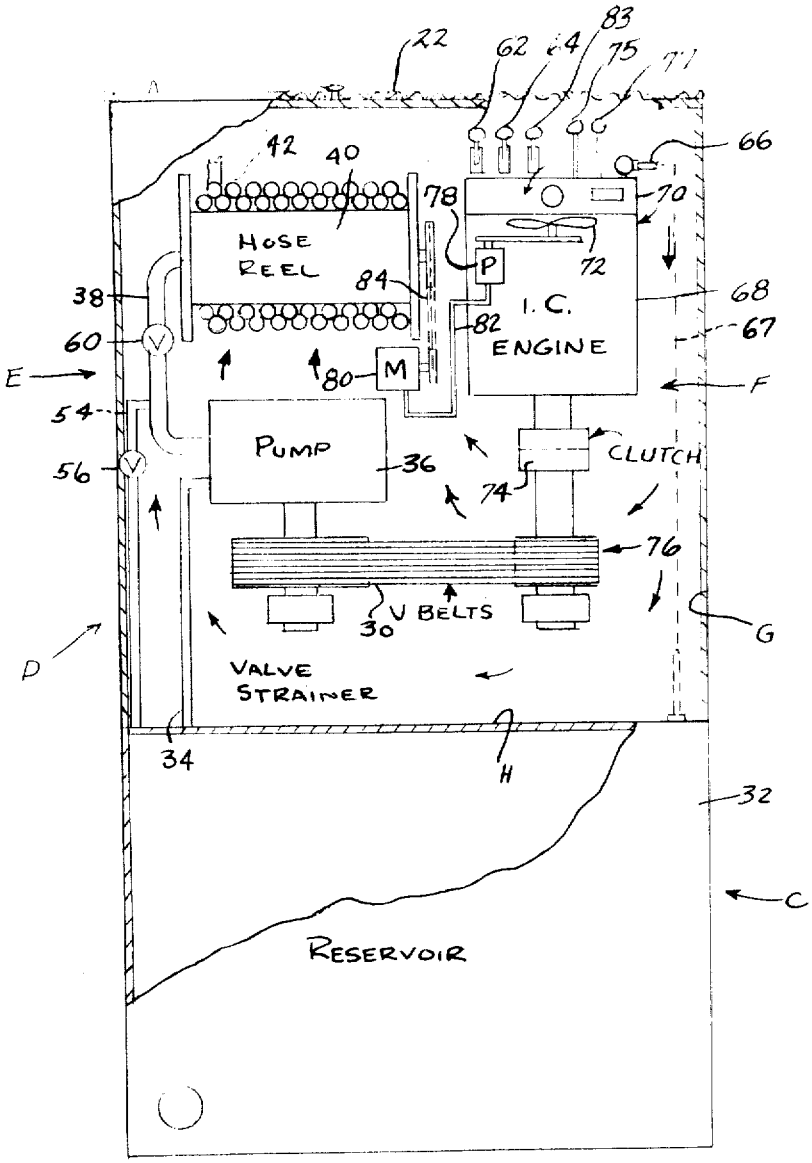
FIG. 6 is a schematic layout view of the sewer cleaning components in accordance with the present invention.

Referring to the drawings, wherein the showings are for the purpose only of illustrating embodiments of water-handling and pumping equipment in accordance with the invention and are not for the purpose of limiting the same, the figures particularly FIGS. 1, 3 and 6 show a sewer cleaning truck A which comprises a truck chassis B of conventional design supporting a reservoir C. Behind the reservoir C upon the rear part or rear platform of the truck chassis, in an area D, the platform supports water-handling components E and pump drive means F. In accordance with the present invention, a shroud assembly G along with the rear wall H of the reservoir completely encloses the area D, including the water-handling components E and pump drive means F, along all four sides and on the top.

Conventionally, the water-handling components are exposed to ambient conditions, and if a shroud of any sort is used, it is only a partial shroud and the rear end and parts of the sides of the shroud conventionally are open still exposing the water-handling components to freezing conditions.

Referring to FIGS. 1 and 3, the truck chassis B is of conventional design, comprising a frame 12 which supports a cab 14, and immediately behind the cab, the truck chassis has mounted on its skirt 15 which includes a bottom platform 16. The reservoir C is supported above the skirt 15 towards the front of the skirt immediately behind the cab 14. Behind the reservoir, attached to the rear of the reservoir, is a U-shaped shroud assembly G including a roof 17 and sidewalls 18 and 20 which along with the rear wall H of the reservoir C encloses the rear platform area D. The shroud assembly is suitably fastened to the back of the reservoir C, and the rear end of the shroud assembly is enclosed by a removable or quickly opened closure 22 (shown in detail in FIG. 2), which in this example is of a canvas material. Such a closure is simply snapped to the top of the shroud assembly along the upper rear edge of the roof by means of snaps 24 (FIG. 1), and is held to the truck at the bottom by means of elastic hook members 26 suitably connected to the opposite sidewalls 18 and 20 of the shroud assembly.

Figure 2:
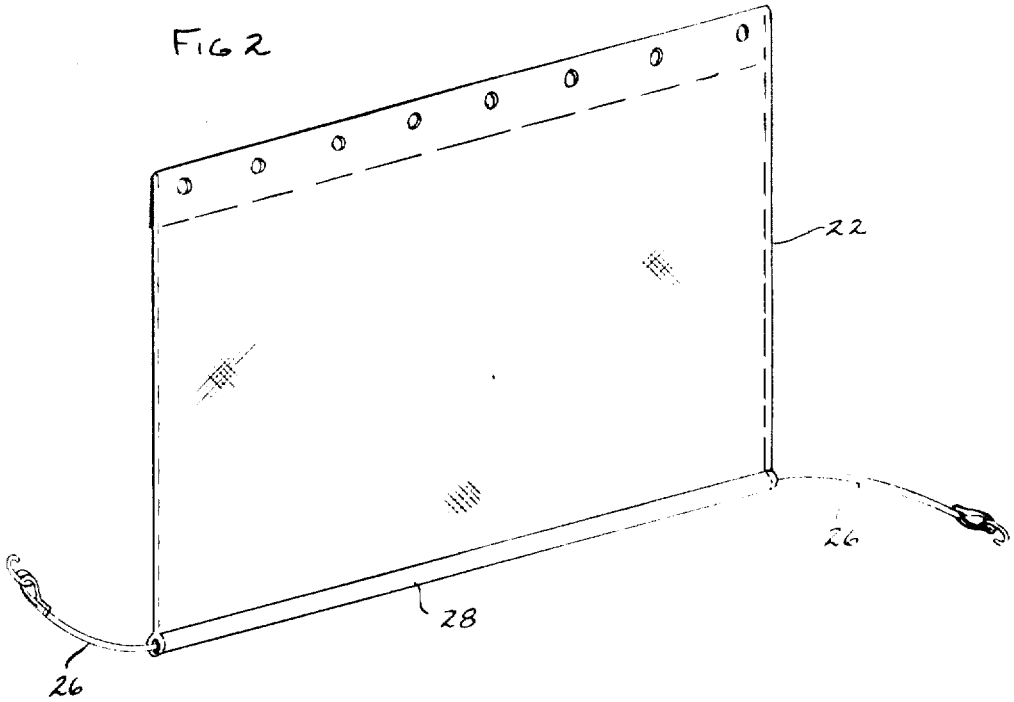
FIG. 2 is a detailed view of a rear closure member in accordance with an embodiment of the invention.

Details of the canvas closure 22 are illustrated in FIG. 2, showing the closure as a substantially rectangular canvas piece. A tubular channel 28 is sewn along the bottom side of the closure, the elastic hook members protruding from opposite sides of the channel for engagement with the shroud sidewalls.

The reservoir for the sewer cleaning truck may hold from 150 to 3,000 gallons or more of water, depending upon the capacity of the unit in question.

On the left-hand side of the platform 16 (FIG. 3), looking towards the front of the truck, there is mounted the drive means F for the water-handling components E, the latter being positioned along the right-hand side of the platform behind the reservoir. This arrangement of components is also shown in the schematic view of FIG. 6.

Figure 7:
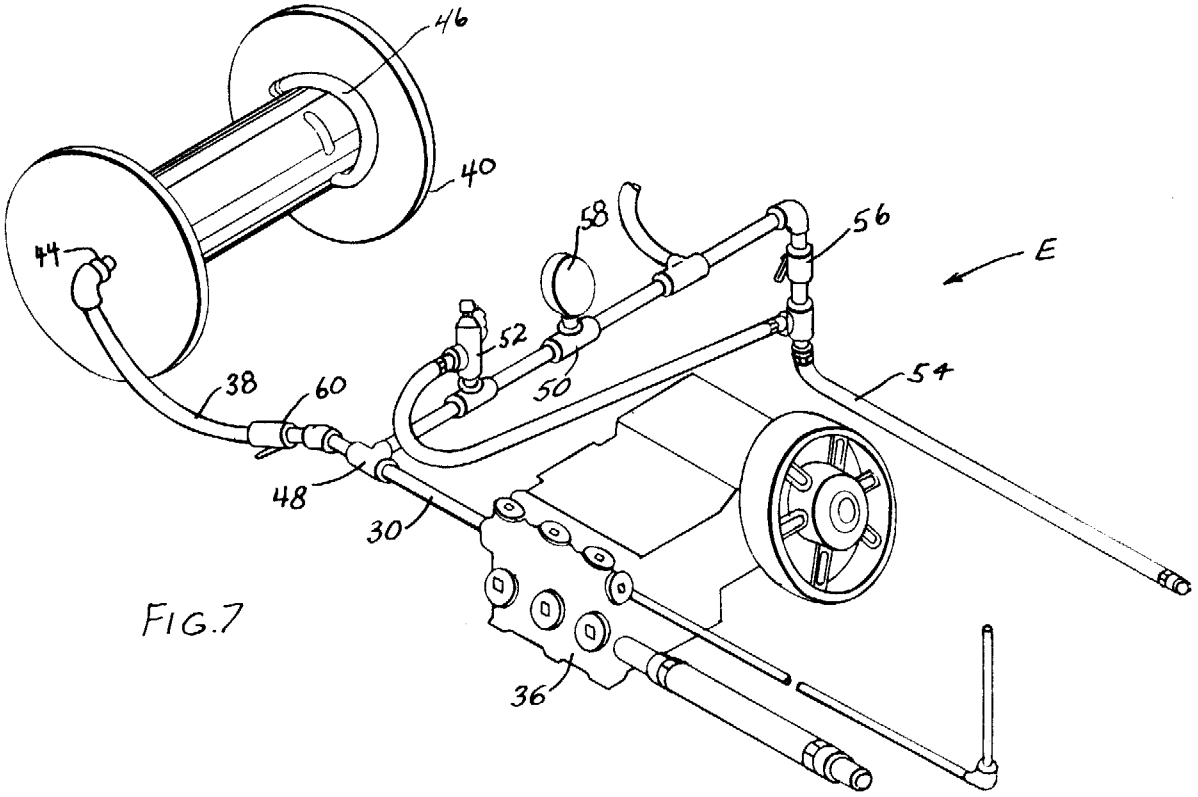
FIG. 7 is a detailed view of the water-handling components in accordance with the invention.

FIGS. 6 and 7 show in detail the water-handling components E of the truck which include a water line 34 connected to the reservoir C, along the rear side H near the bottom thereof. The water line leads to the pressure pump 36 mounted aft of the reservoir, the latter being a conventional reciprocating triplex pump, for instance one made by Worthington Corporation, their Model KCA-1. On the output side of the pump 36, a suitable connection 38 leads to the hose reel 40, mounted further behind the pump, the reel supporting a hose 42 coiled on the reel. As illustrated in FIG. 7, the reel is provided with an axially disposed swivel hose connection 44, and a flexible hose portion (not shown) runs axially inside the reel from the swivel connection to an exposed portion 46 which in turn is connected to the inlet of the hose itself. This arrangement permits the hose to be uncoiled from the reel without interfering with the connection 38 from the pump.

Between the pump and hose, the connector 38 is provided with a suitable tee 48 leading to a manifold 50. The manifold supports a pressure relief valve 52 which is connected with a return line 54 leading back to the reservoir, and also supports a bypass valve 56 also connected to the return line 54 to the reservoir. Between the bypass valve 56 and relief valve 52, the manifold also supports a pressure accumulator 56.

Between the manifold and the reel, in the connection 38, there is disposed a flow shutoff valve 60, which is similar in construction to the bypass valve 56. Both the bypass valve 56 and shutoff valve 60 are mechanically connected to control levers 62 and 64 mounted on the rear of the truck (FIGS. 3 and 6), whereas the relief valve 52 is pressure actuated.

In operation, the pump produces a high-pressure water flow to the hose through shutoff valve 60 when the latter is in an open position by means of lever 64. If it is desired to run the pump without flow of water to the hose, the shutoff valve 60 is closed and the bypass valve 56 is opened, by lever 62, so that the flow of water is recirculated to the reservoir. Should there be an excessive buildup of pressure in the water lines, the relief valve 52 automatically opens for recirculation of excess flow to the reservoir. If desired, the bypass valve and shutoff valve may be actuated by the same control lever so that as one opens the other closes.

Connected to the reservoir C, mounted on the left-hand side of the platform to the rear of the drive means F, is a sight guage assembly 66 connected to the reservoir by line 67 which indicates to the operator the level of water in the reservoir.

It is obvious, referring to FIG. 7 that even though there may be recirculation of water through lines 34, pump 36, manifold 50, bypass valve 56 and return line 54, there are components in which there will be no flow of water and in which freezing could take place. Accordingly, the known practice of providing for recirculation will be of no avail during severe winter conditions. Of particular concern would be the sight gauge 65, shutoff valve 60, relief valve 52 and the hose 42.

The drive means, in a preferred embodiment of the invention comprises an internal combustion engine assembly 68 which is liquid cooled, and which includes a radiator 70 cooled by a suitable fan 72 driven by the engine 68. Connected to the engine 68, through a regular engine clutch mechanism 74, is a drive wheel and V-belt assembly 76 driving the pump 36. The fan and radiator combination comprises a heat source which is oriented so that the fan forces air rearwardly towards the reservoir, and as shown by the arrows in FIG. 6, the air flow is over the clutch mechanism, against the wall of the reservoir, and reversing in direction to pass over and around the water-handling components including the pump, valves, accumulator, hose reel, hose and connections therefor, all of which components are subject to the adverse affects of freezing. In accordance with the present invention, the flow of air is confined to the area D (which contains these components) by the shroud assembly G including closure 22.

An important feature of the invention is that by virtue of the location and orientation of the radiator 70, the warm air is recirculated through the radiator picking up heat in successive passes thereby maintaining the water-handling components at an above-freezing temperature even under very adverse conditions. Directing the flow of air against the wall H of the reservoir also imparts heat to the reservoir. It will be appreciated that other forms of heat sources may be employed. For example, a separate space heater may be used, however, the preferred form of the invention is to use the radiator and fan as described.

Controls for the engine 68 are levers 75 and 77 of FIG. 6.

The numerals 78–84 indicate the hydraulic assembly which causes the reel 46 to rewind the hose 42 following payout, including an hydraulic pump 78 and hydraulic motor 80 operatively connected to the pump 78 by hoses 82. The motor is linked to the reel 40 by a chain drive 84. The control lever for the hydraulic assembly is indicated by the numeral 83.

It is a feature of the invention, with the canvas closure 22 that an operator can stand inside the closure to operate the controls, e.g. 62, 64, and remain warm despite severe winter conditions.

To prevent freezing of water in the water-handling components, the sewer cleaning truck reservoir is filled, and about the same time the internal combustion engine is started. Normally, the clutch 74 is disengaged so that the engine runs at idling speed and the pump is stationary, although alternatively, the clutch can be engaged, utilizing the hose bypass (valve 56) so that the pump also runs circulating water. Also, in the alternative the unit can be constructed without a clutch utilizing the hosse bypass means at all times and water recirculation to permit running the engine while the hose is not being used or between sewer cleaning jobs. The shroud rear closure 22 is in place, particularly if ambient temperatures are extremely low, and the flow of warm air from the heat source forwardly against the reservoir and rearwardly over the critical sewer cleaning components maintains these components above freezing temperature.

It is a feature of the present invention that the platform of the truck in the enclosed area D need not be closed along the bottom, and in fact the drawing FIG. 3 shows the platform 16 as open in the area 99 along the truck centerline. Warm air will rise, and in operation no significant amount of air is lost through the area 99.

Figure 4:
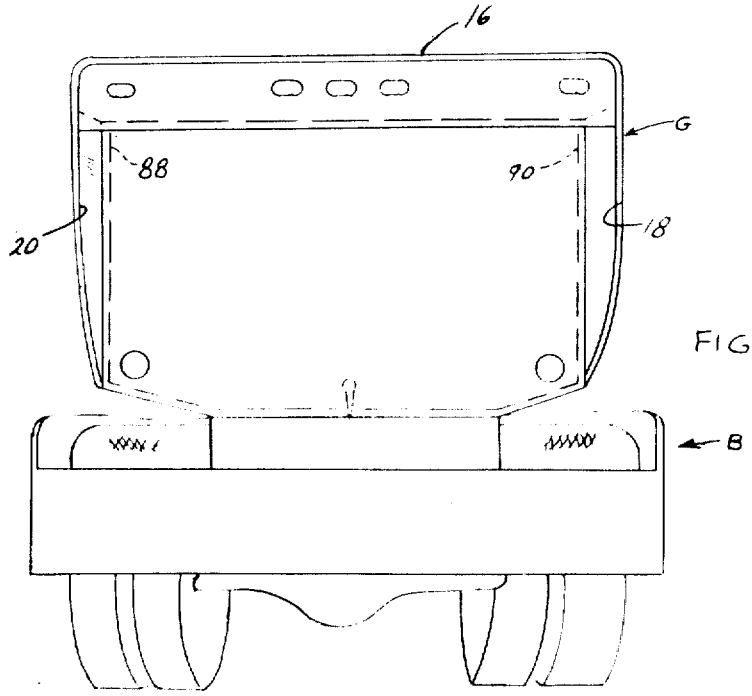
FIG. 4 illustrates another embodiment of a rear closure means in accordance with the invention.
Figure 5:
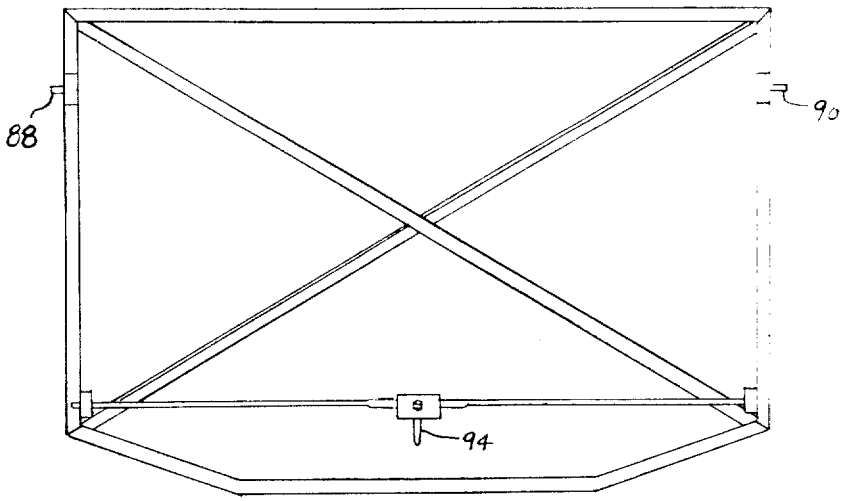
FIG. 5 is a detailed view of the rear closure means of FIG. 4.

FIG. 4 illustrates an embodiment of the invention, which comprises a hinged rear door 86 pivotally mounted on the sides of the shroud on spaced apart opposed pivot points 88 and 90 (FIG. 5). A suitable spring mechanism (not shown) is connected to the upper edge of the door to hold the door in a pivoted upward position once it is raised to that position. A latch 94 at the bottom holds the door in a closed position.

In the embodiment illustrated in FIG. 1, the sides of the shroud assembly C are provided with hinged panels 96 and 98 which can be pivoted upwardly to an open position by means of the shroud rear closure and side panels, the truck can be used at all times despite extreme swings in the ambient temperature.

A further feature and advantage of the invention should also be appreciated. It may sometimes occur, through inadvertence, that the supply of heat from the heat source may be interrupted. One example of this is if the gas supply of the engine is exhausted. Under severe weather conditions, liquid in the lines may freeze before the heat source can be restarted. Under such circumstances, it is not sufficient merely to restart the engine since the pump will be unable to circulate liquid through the blocked lines. With this invention this problem is remedied by disconnecting the clutch 74 and running the engine with the shrouds closed until such time as the heat source has thawed the ice in the lines. Thereafter, the clutch may be engaged and work recommenced.

Although the invention has been described with reference to specific embodiments, variations within the scope of the following claims will be apparent to those skilled in the art.

I claim:

1. In combination with a mobile unit comprising a water reservoir and water-handling components including a hose reel and hose normally coiled thereon, pump means connected between the reservoir and the hose to pump water from said reservoir through said hose, drive means for said pump means and valve means to control the flow of water, the improvement comprising:

a source of heat;

a shroud assembly including a backwall, a pair of sides and a roof extending from said backwall to form said wall an enclosure normally open at the end remote from said reservoir, said enclosure enclosing said water-handling components and said source of heat except for said one end, said shroud assembly further including closure means for closing said one end whereby said water-handling components and said source of heat may be enclosed; and, means associated with said source of heat arranged to direct a heated flow of air over and around said water-handling components and against said wall within the space confined by said shroud assembly and said closure means for recirculation in a continuous flow path which includes said source of heat, the air being reheated thereby, whereby said unit remains operative when the ambient temperature surrounding said reservoir, said shroud assembly and said closure means is below that at which water freezes.

2. The combination of claim 1 wherein said unit is a mobile sewer cleaning unit.

3. The combination of claim 1 including flow bypass means between said pump means outlet end and reservoir for recirculation of water to said reservoir bypassing said valve means and hose, above freezing temperatures even without the circulation of water therein.

4. The combination of claim 1 wherein said drive means is a liquid cooled internal combustion engine, including a radiator and fan means, the latter being oriented to direct a flow of heated air against said wall and over and around said water-handling components confined to the area thereof by said shroud assembly and closure means.

5. The combination of claim 4 wherein said internal combustion engine is spaced away from said wall but along side said water-handling components so that the flow of air follows a generally circular path against the said wall over and around said water-handling components, for recirculation through said internal combustion engine radiator and fan means.

6. The combination of claim 4 wherein said drive means further comprises clutch means associated with said internal combustion engine whereby said engine can be run without pumping water from said reservoir through said hose and valve means.

7. The combination of claim 6 wherein said shroud assembly defines a compartment at the rear end of said unit, the internal combustion engine drive means being disposed along one side of said compartment and the water-handling components being disposed along the other side of the compartment, said internal combustion engine being oriented to direct a flow of air forwardly against said wall and then rearwardly across the water-handling components.

8. In combination with a sewer cleaning mobile unit comprising a water reservoir and sewer cleaning components including a hose reel and hose normally coiled thereon, a high-pressure pump means connected between the reservoir and the hose to pump water from said reservoir through said hose, drive means for said pump means and valve means to control the flow of water; the improvement comprising:

a source of heat;

a shroud assembly including a pair of sides and a roof extending from said reservoir tank to form with a wall of said reservoir an enclosure normally open at the end remote from said reservoir, said enclosure enclosing said water-handling components and said source of heat except for said one end, said shroud assembly further including quick opening closure menas whereby said water-handling components and said heat source may be enclosed; and means associated with said source of heat arranged to direct a heat flow of air over and around said water-handling components and against said reservoir wall within the space confined by said shroud assembly and said quick opening closure means for recirculation in a continuous flow path which includes said source of heat, the air being reheated thereby, whereby said unit remains operative when the ambient temperature surrounding said reservoir, said shroud assembly and said quick opening closure means is below that at which water freezes.

9. The combination of claim 8 wherein said drive means is a liquid cooled internal combustion engine, including a radiator and fan means, the latter being oriented to direct a flow of heated air against said reservoir wall and over and around said water-handling components, said shroud assembly and closure means causing the heated air to be recirculated through said radiator and fan means.

10. The combination of claim 8 wherein said closure means is a substantially rectangular canvas piece including means to fasten said piece across the normally open end of said shroud assembly.

11. The combination of claim 10 wherein said drive means further comprises clutch means associated with said internal combustion engine whereby said engine can be run without pumping water from said reservoir through said hose and valve means.

*12. A mobile sewer cleaning unit comprising: a water reservoir having a back wall; water-handling components including a hose normally coiled on a reel; pump means connected between the reservoir and the hose to pump water from said reservoir through said hose; drive means for said pump means; and means to control the flow of water; said drive means including an internal combustion engine having means to dissipate heat generated therein during operation and means for moving air over said heat dissipating means; a shroud assembly including a pair of sides and a roof extending from said back wall to form with said back wall an enclosure normally open at the end remote from said reservoir, and closure means for said open end movable from an open to a closed position and when in a closed position enclosing said water-handling components and said drive means; said means for moving air being arranged to direct a flow of air within the space defined by said shroud assembly and said closure means when closed, first over said heat dissipating means and then over and around said water-handling*

*components and in contact with said back wall whereby by the operation of said engine said flowing air is heated and can heat said water reservoir and said water handling components and said unit can remain operative when the ambient temperature surrounding said unit is below the temperature at which water freezes.*

*13. The combination of claim 12 wherein said drive means comprises a liquid cooled internal combustion engine, including a radiator and fan means, the latter being oriented to direct a flow of heated air over and around said water-handling components and said wall.*

*14. The combination of claim 12 wherein said shroud assembly defines a compartment at the rear end of said unit, said internal combustion engine being disposed along one side of said compartment and said water-handling components being disposed along the other side of said compartment, said internal combustion engine being oriented to direct a flow of heated air forwardly against said wall and then rearwardly across said water-handling components.*

References Cited

The following references, cited by the Examiner, are of record in the patented file of this patent or the original patent.

UNITED STATES PATENTS

| | | | |
|---|---|---|---|
| 3,165,109 | 1/1965 | Hammelmann | 137—355.16 X |
| 3,423,126 | 1/1969 | Galvin et al. | 296—98 |
| 2,461,974 | 2/1949 | Flora | 180—54 A |
| 3,472,548 | 10/1969 | Comisac | 296—98 X |
| 2,680,490 | 6/1954 | Dafoe | 180—54 A |
| 2,688,513 | 9/1954 | Poimex | 296—98 |
| 2,821,259 | 1/1958 | Garretson | 180—54 B |
| 3,317,049 | 5/1967 | Petretti | 137—344 X |
| 3,396,747 | 8/1968 | Moore | 137—355.21 |
| 1,116,788 | 11/1914 | Bell | 137—344 |
| 2,707,031 | 4/1955 | Williams | 180—54 A |
| 2,573,868 | 11/1951 | Newell | 137—355.21 |
| 3,385,315 | 5/1968 | Decoto et al. | 137—344 |

SAMUEL SCOTT, Primary Examiner